United States Patent [19]

Wan

[11] Patent Number: 4,902,664

[45] Date of Patent: Feb. 20, 1990

[54] THERMALLY STABILIZED CATALYSTS CONTAINING ALUMINA AND METHODS OF MAKING THE SAME

[75] Inventor: Chung-Zong Wan, Somerset, N.J.

[73] Assignee: Engelhard Corporation, Edison, N.J.

[21] Appl. No.: 282,925

[22] Filed: Dec. 7, 1988

Related U.S. Application Data

[63] Continuation of Ser. No. 85,903, Aug. 13, 1987, abandoned.

[51] Int. Cl.$^4$ ............................................. B01J 23/00
[52] U.S. Cl. ................................................... 502/300
[58] Field of Search ......................................... 502/300

[56] References Cited

U.S. PATENT DOCUMENTS 2,767,202 10/1956 Rottig .................................. 502/300

Primary Examiner—Peter D. Rosenberg

[57] ABSTRACT

A catalyst comprises (a) an activated alumina, (b) a substantially water-insoluble bulk stabilizer present in an amount at least sufficient to stabilize the activated alumina against thermal degradation, and (c) one or more platinum group metal catalytic components. The bulk stabilizer may be one or more of calcium sulfate, strontium sulfate or, preferably, barium sulfate. A mixture of activated alumina (and/or activated alumina precursor) and bulk stabilizer particles, e.g., gamma-alumina particles and barium sulfate particles, may be slurried in an aqueous medium and coated onto a carrier substrate. One or more platinum group metal catalytic components may be dispersed onto the activated alumina, e.g., it may be dispersed onto a mixture of activated alumina and bulk stabilizer. The coated carrier substrate may be calcined in air to provide the catalyst.

32 Claims, No Drawings

THERMALLY STABILIZED CATALYSTS CONTAINING ALUMINA AND METHODS OF MAKING THE SAME

This is a continuation of co-pending application Serial No. 085,903 filed on 8-13-87, abandoned.

BACKGROUND OF THE INVENTION

1. Field Of The Invention

The present invention is concerned with improvements in catalysts useful for the treatment of gases to reduce contaminants contained therein. More specifically, the present invention is concerned with improved catalysts of the type often used to treat automotive exhaust gases, such as those often referred to as "three-way conversion" or "polyfunctional" catalysts. These catalysts have the capability of substantially simultaneously catalyzing the oxidation of hydrocarbons and carbon monoxide and the reduction of nitrogen oxides.

2. Background and Prior Art

Catalysts as described above find utility in a number of fields including the treatment of the exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, so-called catalytic converters containing a suitable catalyst are emplaced in the exhaust gas lines of internal combustion engines to promote oxidation of the unburned hydrocarbons and carbon monoxide and the reduction of nitrogen oxides. If the engine operation is too rich in fuel to provide sufficient oxygen inherently in the exhaust gas, oxygen (air) may be introduced into the exhaust gas as required. The use of separate catalyst beds to promote, respectively, oxidation and reduction, is known and it is also known to use a catalyst system combined in a single bed to substantially simultaneously promote both the oxidation and reduction reactions. A great deal of activity has been engendered in the field in an attempt to economically produce catalysts which exhibit good activity and long life in promoting such three-way conversion of hydrocarbons, carbon monoxide and nitrogen oxides to carbon dioxide, water and nitrogen. Three-way conversion catalysts usually require that the ratio of air to fuel ("A/F ratio") introduced into the engine whose exhaust gas is being treated not exceed a narrow deviation from the stoichiometric ratio in order to achieve optimal, sustantially simultaneous reduction/ oxidation ("redox") reactions. For purposes of promoting three-way conversion, catalysts comprising one or more platinum group metals dispersed upon a high surface area support material are well known in the art. The support material may comprise a high surface area alumina coating carried on a carrier substrate such as a monolithic carrier comprising a refractory ceramic honeycomb structure, as is well known in the art.

Such high surface area alumina support materials, sometimes referred to as "active" or "activated" alumina, typically exhibit a BET surface area in excess of 60 $m^2/g$, e.g., up to about 150 or 200 $m^2/g$ or more. Activated alumina is usually a mixture of the gamma and delta phases of alumina, but may also contain substantial amounts of other phases such as amorphous, eta, kappa and theta alumina phases. Typical catalyst compositions comprise a minor amount of a platinum group metal component such as platinum or palladium, optionally including one or more of rhodium, ruthenium and iridium dispersed on an activated alumina support material. The alumina support material may be carried on a carrier substrate, such as a honeycomb type substrate, having a plurality of fine gas flow passages extending through it. In order to facilitate coating these fine passages, a slurry of exceedingly fine particles of activated alumina, sometimes referred to as a "washcoat", may be prepared and applied to the substrate. Alternatively, or in addition, an activated alumina precursor may be applied to the substrate and then converted to activated alumina. In any case, the resultant high surface area support alumina material enhances the catalytic activity of the composition by enabling dispersal of the catalytically active platinum group metal component on the high surface area alumina washcoat material instead of directly upon a low surface material such as the carrier substrate.

A common deficiency associated with such catalyst compositions is thermal degradation of the activated alumina support material by extended exposure to high temperatures encountered in the treatment of the gases, such as internal combustion engine exhaust gases. In a moving vehicle for example, exhaust gas temperatures can reach 1000° C. Such elevated temperatures cause the activated alumina support material to undergo a phase transition to lower surface area alumina, with accompanying volume shrinkage, especially in the presence of steam, whereby the catalytic metal become occluded in the shrunken support medium with a loss of exposed catalyst surface area and a corresponding decrease in catalytic activity. It is a known expedient in the art to stabilize the alumina against such thermal degradation by the use of stabilizer materials such as zirconia, titania, alkaline earth metal oxides such as baria, calcia or strontia or, most usually, rare earth metal oxides, for example, oxides of cerium, lanthanum, neodymium, praseodymium and mixtures of two or more rare earth metal oxides, including the commercially available mixtures of rare earth metal oxides. For example, see U.S. Pat. No. 4,171,288 of Carl D. Keith, et al.

The use of support materials other than activated alumina are known. For example, because rhodium interacts deleteriously with gamma alumina, particularly under lean exhaust conditions, the art has suggested substituting materials such as alpha-alumina (U.S. Pat. No. 4,172,047) or zirconia (U.S. Pat. No. 4,233,189) as support materials which are not interactive with rhodium. However, alpha-alumina and zirconia are relatively low surface area materials, which is disadvantageous inasmuch as catalyst durability in such gas purification use depends to a certain extent on the surface area of the support material.

U.S. Pat. No. 4,539,311 discloses a lead-resistant catalyst for treating motor vehicle exhaust fumes, which catalyst may comprise a honeycomb support coated with an alumina washcoat catalytic coating. A high surface area alumina which may incorporate ceria is impregnated first with a barium moiety, such as aqueous solution of a barium compound, e.g., barium nitrate, which decomposes to produce barium oxide on firing at over 400° C. After such firing the catalyst is impregnated with a dispersion of a platinum group metal moiety, such as by soaking the alumina in an aqueous solution of a metal compound, e.g., chloroplatinic acid, which on firing at over 400° C. decomposes to leave behind either the platinum group metal or a compound which converts to the metal when the catalyst is placed in use.

U.S. Pat. No. 4,294,726 discloses a three-way conversion catalyst composition containing platinum and rhodium supported on activated alumina as well as cerium oxide, zirconium oxide and iron oxide in stated proportions. The catalyst is obtained by impregnating a gamma alumina carrier material with an aqueous solution of cerium, zirconium and iron salts or by mixing the alumina with the oxides of cerium, zirconium and iron. The material is then calcined at 500° to 700° C. in air. The addition of ceria-zirconia-iron oxide is followed by impregnating the treated carrier material with aqueous salts of platinum and rhodium and then treating the impregnated material in a hydrogen-containing gas at a temperature of 250°–650° C. Thermal stabilization of the alumina may be separately carried out by impregnation of the alumina with a solution of calcium, strontium, magnesium or barium compounds. The addition of ceria-zirconia-iron oxide is stated to enable operation at leaner A/F ratios.

U.S. Pat. No. 3,966,790 discloses catalysts having good high temperature stability and which include a platinum group metal deposited on an activated alumina coating which is stabilized against thermal degradation by dispersing therein selected metal oxides which serve as stabilizers. The metal oxides may be selected from Group IVA metals (e.g., silicon and tin); Group IVB metals (e.g., titanium, zirconium, hafnium and thorium); Group IIA metals, i.e., alkaline earth metals (e.g., beryllium, magnesium, calcium and barium); and Group VIB metals (e.g., chromium, molybdenum and tungsten). The composites may be added by impregnating the activated alumina with solutions of soluble precursors of the stabilizers or by co-precipitating the alumina and stabilizers from aqueous solutions. High surface area colloidal silica is stated (column 4, line 56 et seq) to be a useful additive; a silica sol containing silica in a particle size of about 15 millimicrons is stated to be particularly useful.

The prior art has thus attempted to ameliorate thermally induced phase transformation of the alumina support material from high surface area to low surface area phases (e.g., from gamma to alpha alumina) by stabilization of the support material. Conventionally, this is accomplished by impregnation of the alumina support material with a solution of a metal compound precursor of the desired stabilizer oxide. Upon drying and calcining of the impregnated activated alumina, an alumina support material containing dispersed stabilizer is obtained. As noted above, among such stabilizers are alkaline earth metal oxides and rare earth metal oxides. It is believed that the stabilizer cations located at the surface of the alumina particles readily diffuse into the surface lattices of the alumina, providing interaction of the stabilizer ions with the alumina when sufficiently high temperature, e.g., of 800° C. or more, are reached. In this way, thermally induced phase transformation of the activated alumina support to lower surface area phases such as alpha alumina can be effectively retarded.

Conventional methods of preparing an alumina support material washcoat include ball milling of the stabilized activated alumina in an acidified medium to reduce its particle size in order to form a coatable slurry or washcoat of the alumina. However, the acid ball milling results in an appreciable loss in efficiency of the stabilization treatment, the presence of acid in the milling process apparently causing the stabilizers to form soluble ionic species, colloidal particles or hydrated gel type structures which render the stabilization less effective.

The art also shows the inclusion in catalyst compositions comprising activated alumina support materials and catalytic and/or catalyst modifier materials, e.g., a metal oxide, added in bulk form, that is, added as solid particulate materials rather than by impregnation of the alumina with a solution of a suitable precursor. For example, bulk ceria or bulk zirconia may be added to the composition as shown in U.S. Pat. No. 4,624,940.

SUMMARY OF THE INVENTION

In accordance with the present invention there is provided a catalyst comprising (a) activated alumina, (b) a substantially water-insoluble bulk stabilizer selected from the group consisting of one or more of calcium sulfate, strontium sulfate and barium sulfate, the bulk stabilizer being present in an amount sufficient to stabilize the activated alumina against thermal degradation, and, (c) a catalytic component, for example, a platinum group metal catalytic component, dispersed on the activated alumina. The activated alumina may be disposed on a carrier substrate.

In accordance with one aspect of the invention, the catalyst composition comprises an admixture of the activated alumina and the bulk stabilizer, the bulk stabilizer being present in an amount of from about 0.5 to 50%, e.g., 1 to 30%, by weight of the weight of the activated alumina.

Another aspect of the invention provides for the bulk stabilizer to be comprised of particles at least about 0.1 micron in diameter. The activated alumina may be an unstabilized alumina except insofar as it is stabilized by the presence of the bulk stabilizer, or it may be a stabilized alumina independently of the bulk stabilizer. The mixture of activated alumina and bulk stabilizer may be coated upon a carrier substrate.

In another aspect of the invention there is provided a method of making a catalyst comprising activated alumina and a thermally stabilizing amount of a substantially waterinsoluble bulk thermal stabilizer selected from the group consisting of one or more of calcium sulfate, strontium sulfate and barium sulfate. The method comprises combining the particulate bulk stabilizer with one or both of the activated alumina and activated alumina precursor, e.g., mixing them to provide an admixture thereof, and depositing a catalytic component on the activated alumina. When the precursor is present, it is converted to activated alumina.

Other aspects of the present invention include one or more of the steps of dispersing a platinum group metal component on the activated alumina, applying a coating of the alumina and bulk stabilizer, e.g., as an admixture thereof, to a carrier substrate, and calcining the thus-coated substrate having the platinum group metal catalytic component dispersed on the alumina. This aspect of the invention provides on the carrier a calcined coating of the activated alumina and bulk stabilizer having a platinum group metal catalytic component dispersed thereon.

The term "platinum group metal catalytic component" as used herein and in the claims means and includes one or more platinum group metals or compounds or complexes thereof which, upon calcination or use of the catalyst, provides or converts to a catalytically active form, usually the metal and/or metal oxide.

The term "platinum group metals" has its usual meaning as comprising the metals platinum, rhodium, palladium, iridium, ruthenium and osmium.

The term "substantially water-insoluble" is used herein as a convenient way to collectively refer to those sulfates of calcium, strontium and barium which exhibit a solubility of less than 0.5 gram of the alkaline earth metal sulfate per 100 milliliters (ml) of water.

The term "activated alumina precursor" means one or more aluminum compounds or complexes which may be converted to activated alumina.

Other aspects of the invention will be apparent from the following detailed description.

DETAILED DESCRIPTION OF THE INVENTION AND SPECIFIC EMBODIMENTS THEREOF

According to the present invention, substantially water-insoluble stabilizers in bulk form, i.e., in the form of solid particulate material, are incorporated into the alumina washcoat. This may be done simply by mixing or otherwise combining the bulk stabilizer particles with activated alumina particles and/or with an alumina precursor such as alumina sol and/or soluble aluminum salts to form a washcoat slurry. Such combining may be carried out either before or after impregnation of the activated alumina with catalytic metal components such as platinum group metal catalytic components. Suitable bulk stabilizer materials, generally exhibiting practical insolubility in aqueous acidic media, include one or more of the substantially water-in-soluble alkaline earth metal sulfates, with barium sulfate being the preferred material. The bulk stabilizer particles may be at least about 0.1 micron in diameter and the quantity of the bulk stabilizer material added to the alumina support material is generally between 0.5% to 50% by weight of the alumina, or preferably between 1% to 30% by weight of the alumina.

Alumina support materials containing bulk barium sulfate demonstrate significant improvement in thermal stability of the alumina and the stability of platinum group metal components distended upon the support material. Bulk substantially water-insoluble alkaline earth metal sulfates, particularly barium sulfate, when admixed with activated alumina provide thermal stabilization of the alumina and this attribute is not unduly adversely affected by acidification of the substantially water-insoluble alkaline earth metal sulfates. Thus, each of the substantially water-insoluble alkaline earth metal sulfates (calcium sulfate, strontium sulfate and barium sulfate) possesses a very slight solubility in water, none greater than 0.3 gram per 100 ml of water. In contrast, beryllium sulfate and magnesium sulfate, which are excluded from the definition of "substantially water-insoluble" alkaline earth metal sulfates, exhibit a significantly greater water solubility, at least in warm water in the case of beryllium sulfate. The substantial water insolubility of the specified alkaline earth metal sulfates in aqueous acidic media enables acidified ball milling of the activated alumina in admixture with the substantially water-insoluble alkaline earth metal sulfates while retaining a high degree of thermal stabilization of the alumina. In fact, the bulk substantially water-insoluble alkaline earth metal sulfate stabilizers of the invention provide a degree of thermal stabilization of the activated alumina which is often higher than that obtainable by other, more cumbersome or expensive manufacturing expedients. For example, barium sulfate shows greater effectiveness in thermal stabilization of alumina washcoats than do conventional rare earth oxide-stabilized aluminas after acid-milling processes using weak acids such as acetic acid. Without wishing to be bound by a particular theory of how the bulk substantially water-insoluble alkaline earth metal sulfates effectuate thermal stabilization, apparently, the close contact of the bulk particles of the substantially water-insoluble alkaline earth metal sulfates with the alumina particles in the washcoat matrix provides the necessary path for the barium (and/or calcium and/or strontium) cations to diffuse across the solid-solid interface with the activated alumina when sufficiently high temperatures are reached, and thereby enter into and stabilize the activated alumina lattice. Thus, a simple in-situ thermal stabilization method is accomplished by practice of the invention, which practice involves a simple combining or mixing of solid particles of alumina and/or alumina precursor and substantially water-insoluble alkaline earth metal sulfate(s). The practice of the present invention avoids the necessity for expensive additional manufacturing steps in order to stabilize the alumina, such as impregnation with solutions of stabilizer precursors and calcining, co-precipitation techniques, the use of expensive colloidal materials and the like.

Before describing in detail the preparation of catalyst compositions in accordance with the present invention and of comparative, prior art compositions, it will be helpful to describe generally some aspects of catalyst compositions of the type in which the present invention may be embodied.

Generally, the catalysts of the present invention may include a carrier substrate, such as a monolithic honeycomb or a foam-type ceramic or metal structure, on which a coating of catalytic material is applied as a so-called washcoat. The catalytic material may be provided in the form of a platinum group metal catalytic component dispersed on an activated alumina support material, the combination comprising a coating or washcoat applied to a honeycomb carrier substrate. The carrier substrate may comprise one or more cylindrical shaped members having a plurality of fine, parallel gas flow passages extending therethrough. Typically, there may be from 60 to 600 or more such parallel, gas flow passages per square inch of the face of the honeycomb member, the walls of these passages being coated with the catalytic washcoat material. The coating of catalytic material may be applied by dipping the monolith into the washcoat material, i.e., into an aqueous slurry of the alumina particles. The alumina particles are generally pre-impregnated with the catalytic material but the catalytic material may also be applied in a step subsequent to coating the alumina onto the substrate carrier. The substrate carrier may comprise monolithic honeycombs made from metals such as corrosion-resistant alloys or, more typically, from ceramic type materials comprising refractory crystalline materials such as sillimanite, magnesium silicates, zirconia, petalite, spodumene, cordierite, mullite, alumino-silicates or combinations of such materials. Generally, such materials comprise varying compositions of silica-magnesia-alumina and have some inherent porosity but a very low surface area compared to that of activated alumina. The catalytic coating comprises catalytic metals and/or compounds dispersed on refractory inorganic oxide supports, typically activated alumina, or activated alumina with one or more other oxides as additives for increased strength, thermal stability, etc. The catalyst compositions of the present invention generally comprise an activated alumina support on which catalytic metal components, such as platinum group metal components optionally supplemented with base metal catalytic components, are dispersed. The activated alumina, as described above, provides a high surface area support which enhances the catalytic activity of the catalytic metal components dispersed thereon. The catalytic metal components are dispersed on the activated alumina typically by impregnating the activated alumina with solutions of soluble compounds of the catalytic metals or liquid dispersions of complexes of the catalytic metal compounds.

Activated alumina is usually available in particulate size range which are much too large to be slurried and coated onto carrier substrates such as honeycomb carriers having fine gas flow passages, or otherwise used to make the catalysts of the invention. For example, activated alumina is usually available in a particle size of 50% by weight of the material being greater than 30 microns in diameter. Therefore, the particles must be reduced in size as the first step in making the catalysts of the invention. For example, it is conventional practice to ballmill the powder of activated alumina particles as received from the manufacturer, to a much smaller particle size range on the order of particles of a size of 90% by weight of the material having a diameter of less than 15 microns. The milling is carried out in an acidified liquid milling medium, usually an aqueous medium, in which the alumina is dispersed as a solid phase to provide an aqueous slurry of alumina. The bulk stabilizers may be admixed into the slurry of alumina either before or after the milling to form a combined slurry of activated alumina and bulk stabilizer. Alumina precursors such as alumina sol, aluminum hydrate and/or soluble aluminum salts such as aluminum nitrate may be added to the combined slurry to form a washcoat slurry. These alumina precursors will easily convert to alumina upon further calcining, i.e., upon heating in air at temperatures of, for example, 350° C. to 550° C. Alumina precursor is converted to activated alumina to enable dispersal of a platinum group metal catalytic component thereon.

Suitable monolithic honeycomb carrier substrates, for example, cordierite carriers having 400 gas flow passages per square inch of face area, are dipped into the well agitated slurry in order to coat the fine gas flow passages of the monolith with the slurry. As known in the art, certain techniques may be employed to insure that all or substantially all of the parallel, fine, gas flow passages are filled with the slurry. Excess slurry is removed from the monoliths, such as by blowing compressed air through the fine gas flow passages, to leave behind a thin coating of the slurry on the walls of the gas flow passages. The slurry coated substrates are then dried, usually by being heated to an elevated temperature on the order of 100° C. or so, and the dried, coated monoliths are then heated in air at a still further elevated temperature, preferably not in excess of about 600° C., more preferably not in excess of about 500° C., e.g., to a temperature of about 350° C. to 450° C., to calcine the coating. Such calcination has the effect of forming a hard adherent coating of the catalytic material on the substrate and helps to fix the catalytic metal component, for example, by decomposing the catalytic metal compound to a water insoluble form. Obviously, instead of transporting the coated monoliths from a drying to a calcining zone, the same furnace may be used for drying and calcining by merely elevating the temperature after an initial drying period.

Specific embodiments of the invention and prior art compositions were prepared and their respective thermal stabilization compared as set forth in the following examples.

EXAMPLE I

A. Alumina

An activated gamma-alumina powder, designated as Alumina Powder A and having a BET surface area of 130 $M^2/g$ and a particle size of 95% by weight of the particles being less than 50 microns in diameter was used in preparation of the samples.

B. Preparation of Comparative Samples

Separate portions of Alumina Powder A were impregnated, one with an aqueous solution of barium nitrate and one with an aqueous solution of cerium nitrate. After drying and calcining the impregnated powders at 600° C. for two hours, one powder, designated Alumina Powder B contained 0.8 weight percent BaO as a satabilizer and the other powder, designated Alumina Powder C, contained 11.5 weight percent $CeO_2$ as a stabilizer. Each of Alumina Powders A (unimpregnated with stabilizer precursor), B and C was separatively ball milled in aqueous media in the presence of chloroplatinic acid and one weight percent hydrochloric acid (36.5% HCl) to form a slurry having an average alumina particle size of 90 percent by weight of the particles being less than 15 microns in diameter. Each slurry was further treated by hydrogen sulfide gas to provide a platinum species dispersed as a platinum metal catalytic component on the alumina. The resultant washcoat slurries made from respectively, Alumina Powders A, B and C were designated as Slurries A, B and C. Portions of each of Slurries A, B and C were dried in a thin layer on a watch glass at 125° C. for three hours and then calcined in air at 450° C. for one hour to obtain three washcoat samples having a one percent by weight platinum loading. These comparative samples of prior art alumina containing catalysts were Washcoat Sample C1 (made from Slurry A), Washcoat Sample C2 (made from Slurry B) and Washcoat Sample C3 (made from Slurry C). Sample C1 was thus made from unstabilized ball milled Alumina Powder A and Washcoat Samples C2 and C3 were thus made, respectively, from ball milled Alumina Powders B and C which were thermally stabilized by the prior art impregnation techniques as described above.

C. Preparation of Samples Exemplary of the Invention

Two portions of Washcoat Slurry A (no stabilizer) were admixed with bulk barium sulfate (from Baker Chemicals) of 98% purity with vigorous agitation to provide quantities of bulk barium sulfate in these exemplary samples as given below. The samples were then dried and calcined in air at 450° C. for one hour to provide stabilized washcoat samples in accordance with one embodiment of the present invention. These samples were denominated Sample E1, containing 1.5 weight percent $BaSO_4$, expressed as a percentage of the weight of alumina, and Sample E2 containing 4.5 weight percent $BaSO_4$, same basis. Similarly, one portion of Washcoat Slurry C (stabilized with $CeO_2$ obtained by solution impregnation and calcining) was admixed with 4.5 weight percent (same basis) of the same bulk barium sulfate. After drying and calcining in air at 450° C. for one hour, a stabilized washcoat sample in accordance with another aspect of the invention was obtained and denominated Sample E3.

D. Aging of the Samples

All the alumina washcoat samples (Samles C1, C2, C3, E1, E2 and E3) were aged in air at 1000° C. for 24 hours and at 1100° C. for 4 hours, respectively. The results of measurements of their respective BET surface areas after the aging are shown in Table I below.

TABLE I

Surface Area Retention After Aging

| Washcoat | | Surface Area, m²/gram | |
|---|---|---|---|
| Sample | Stabilizer | 1000° C./ 24 hours | 1100° C./ 4 hours |
| C1 | none | 31.4 | 10.9 |
| C2 | 0.8% BaO | 38.6 | 22.0 |
| C3 | 11.5% CeO$_2$ | 44.0 | 12.0 |
| E1 | 1.5% BaSO$_4$ (bulk) | 47.3 | 26.3 |
| E2 | 4.5% BaSO$_4$ (bulk) | 74.4 | 58.1 |
| E3 | 4.5% BaSO$_4$ (bulk) plus 11.5% CeO$_2$ | 61.2 | 41.5 |

The results of Table I clearly demonstrate that alumina washcoat Samples E1 and E2 containing bulk barium sulfate but otherwise unstabilized in accordance with one aspect of the present invention, provide more effective thermal stabilization after aging than do the washcoats containing unstabilized alumina of Sample C1 or the prior art washcoats containing stabilized aluminas of Samples C2 and C3. Similarly, the alumina washcoat Sample E3, containing bulk barium sulfate admixed with alumina which is also ceria-stabilized by the known impregnation technique in accordance with one aspect of the present invention, provides more effective stabilization than does the corresponding prior art Sample C3.

EXAMPLE II

A. Preparation of Prior Art Catalysts

Alumina Powder A of Example I was ball milled in the presence of two weight percent hydrochloric acid (36.5% HC1) to form a slurry. This uncatalyzed slurry and Washcoat Slurry A of Example I having platinum dispersed thereon as described in Example I were combined and a carrier substrate comprising a 400 cell/in² cordierite honeycomb monolith (from Corning) was coated with the slurry and calcined in air at 400° C. for one hour. The resulting prior art comparative catalyst was denominated Catalyst C4 and had a platinum loading of 10g Pt/ft³ and contained 1.2 g/in³ of alumina. (As used in this application, reference to loading or quantities of materials in a catalyst including a carrier substrate such as a honeycomb monolith expressed as a given weight per "ft³" or per "in³" refers to the unit volume of catalyst including the voids provided by the gas flow passageways of the honeycomb monolith. This is accepted useage in the art as it provides a standard which accommodates different volumes of void gas flow passages in different carrier substrates.) A second catalyst was prepared in a similar fashion except that Alumina Powder C of Example I was used to prepare Washcoat Slurry C and thus provide a ceria-stabilized alumina impregnated with platinum as in Example I. The resulting catalyst had 10g Pt/ft³ loading with 1.2 g/in³ alumina and was stabilized with 11.5 weight percent CeO$_2$. This comparative catalyst sample was designated as Catalyst C5.

B. Preparation of Honeycomb Catalysts in Accordance With One Aspect of the Invention Two catalysts were prepared according to the same procedures used for Catalysts C4 and C5 except that 4.5 weight percent (same basis as in Example I) of the same bulk barium sulfate as used in Example I was incorporated into each of the combined washcoat slurries before coating the slurries onto the cordierite monolith. The resulting catalysts in accordance with an aspect of the present invention had platinum loadings of 10g Pt/ft³ and were respectively designated as Catalyst E4 (otherwise unstabilized alumina washcoat containing bulk barium sulfate stabilizer) and Catalyst E5 (ceria-stabilized alumina washcoat containing bulk barium sulfate stabilizer).

C. Thermal Aging of the Catalyst Samples

The four Catalyst Samples C4, C5, E4 and E5 were thermally aged in a nitrogen stream containing 10 volume percent of steam at 982° C. for 12 hours. After aging, the catalysts were evaluated on a laboratory reactor using a simulated exhaust gas mixture containing 0.24 volume percent CO, 0.08 volume percent H$_2$, 0.27 volume percent O$_2$, 240 parts by volume per million parts by volume (vppm) C$_3$H$_6$, 60 vppm C$_3$H$_8$, 500 vppm nitrogen oxides, 10 volume percent CO$_2$, 10 volume percent H$_2$O, balance N$_2$. The simulated exhaust gas mixture was passed through the catalyst at 400° C. at a volumetric flow rate of 50,000 volumes of gas (measured at standard temperature and pressure) per volume of catalyst per hour. The simulated air to fuel weight ratio ("A/F") was fluctuated ±0.5 A/F unit at 1 Hz perturbations. An air to fuel ratio of 14.65 is considered to be stoichiometric and fluctuation is expressed in terms of units of this ratio about the stoichiometric point, so that a fluctuation of "±0.5 A/F" means fluctuation from 14.15 to 15.15 simulated air to fuel ratio.

The percent conversion of the hydrocarbon ("HC") carbon monoxide ("CO") and nitrogen oxides ("NO$_x$") components of the gas, i.e., the catalytic activity of the Samples under the specified evaluation conditions, are shown in Table II below.

TABLE II

Conversion Efficiency of Thermally Aged Catalysts

| | Conversion at Stoichiometric A/F Set-Point | | |
|---|---|---|---|
| Catalysts | HC | CO | NO$_x$ |
| C4 | 81 | 62 | 41 |
| C5 | 16 | 14 | 9 |
| E4 | 93 | 73 | 53 |
| E5 | 76 | 54 | 32 |

The results of Table II clearly indicate that stabilization by bulk barium sulfate addition to the washcoat according to the present invention provides better catalytic activity of the aged platinum catalyst.

EXAMPLE III

A. Preparation of Comparative Samples

Alumina Powder A and Alumina Powder B from Example I were separately ball milled in the presence of two weight percent hydrochloric acid (36.5% HC1) to form two slurries. Each slurry was impregnated with an aqueous solution containing RhCl$_3$ and then further treated with H$_2$S to fix the rhodium. A portion of each slurry was dried in a thin layer on a watch glass at 125° C. for three hours and then calcined in air at 450° C. for one hour to obtain washcoat samples respectively denominated Washcoat Sample C6 made from milled Alumina Powder A and Washcoat Sampled C7 made from Alumina Powder B, respectively. Samples C6 and C7 each contain 0.6% by weight rhodium as the platinum group metal catalytic component.

Another portion of Alumina Powder B was impregnated with an aqueous solution of $RhCl_3$ and fixed as above. This sample was not ball milled or otherwise acidified. After drying and calcining at 450° C., a sample containing 0.6 weight percent rhodium was obtained and denominated Washcoat Sample C8.

B. Preparation of Samples in Accordance with Embodiments of the Present Invention A washcoat sample in accordance with an embodiment of the present invention was prepared in the same fashion as Washcoat Sample C6 except that the Alumina Powder A and 4.5 weight percent (same basis as in Example I) of the same bulk barium sulfate as used in Example I were ball milled together under the same conditions as Paragraph A of this Example, and then the 0.6% by weight rhodium impregnation and fixing steps as in Paragraph A were carried out. The resultant sample designated Washcoat Sample E6.

C. Aging of the Samples

All the alumina Washcoat Samples C6, C7, C8 and E6 were aged in air at 1000° C. for 24 hours and at 1100° C. for 4 hours respectively. The results of BET surface areas after aging are shown in Table III below.

TABLE III

| | | Surface Area Retention After Aging | |
|---|---|---|---|
| | | Surface Area, $m^2$/gram | |
| Washcoat | | 1000° C./ | 1100° C./ |
| Sample | Stabilizer | 24 hours | 4 hours |
| C6 | none | 34.2 | 11.8 |
| C7 | 0.8% BaO | 41.4 | 22.5 |
| C8 | 0.8% BaO (unmilled powder) | 88.1 | 61.6 |
| E6 | 4.5% $BaSO_4$ | 71.0 | 52.5 |

Table III indicates that the excellent thermal stability of stabilized alumina powder containing rhodium, illustrated by Washcoat Sample C8, is significantly reduced by ball milling in acidified aqueous media, as illustrated by Washcoat Sample C7. Washcoat Sample C7 differs from C8 only in that is was subjected to an acid medium ball milling step. However, the stability of the alumina support material as shown by Washcoat Sample E6 can be significantly improved by introducing the bulk barium sulfate as the stabilizer in accordance with the present invention.

It may be desired to impregnate a portion of the activated alumina with one catalytic metal component and another portion of the activated alumina with another catalytic metal component and then combine the two separately impregnated batches of activated alumina to make the catalytic material of the invention. Thus, in the case of preparing a platinum/palladium/rhodium three-way conversion catalytic material, a rhodium compound is placed into solution and the solution (which optionally may also contain soluble compounds of platinum and/or palladium) is contacted with activated alumina particles which are substantially free of rare earth oxides. The reason for this is the discovery (which forms no part of the present invention) that intimate contact between rhodium and rare earth metal oxides has a deleterious effect on operation of the catalyst after exposure to high temperatures at lean operating conditions. (The use of lean operating conditions, i.e., high air-to-fuel ratios, in automobile engines improves the fuel economy of the engine but the resulting lean exhaust tends to reduce the activity of platinum and rhodium metal catalysts.)

In any case, the rhodium compound-impregnated gamma-alumina particles may be combined with another batch of activated alumina which has separately been impregnated with platinum and palladium compounds in a similar fashion. The platinum and palladium impregnated alumina advantageously may contain one or more suitable modifiers, as described below, impregnated into the alumina in the same manner as the catalytic metal compounds, in order to enhance stability of the finished product. The separate impregnated batches of alumina may either be combined in a liquid medium such as water to provide a slurry of the mixed impregnated particles in a liquid, which slurry is applied to the carier substrate, or the separate impregnated batches of alumina may be applied successively in layers to the carrier substrate.

As noted above, one or more modifiers may optionally be employed in activated-alumina containing catalysts in accordance with the present invention. Conventional thermal stabilizers may be employed to supplement the bulk substantially water-insoluble alkaline earth metal sulfates of the present invention. However, such supplemental thermal stabilizers are not essential and, as noted above, one aspect of the present invention provides that the activated alumina may be an unstabilized alumina, except for the bulk stabilizer. If used, conventional thermal stabilizers used to supplement the retardation of undesirable alumina phase transitions at elevated temperatures provided by the bulk stabilizer of the invention may be any known stabilizer or combination of known stabilizers. Other modifiers such as oxides of chromium, iron, and nickel, or their precursors, may also be employed. Some modifiers may serve more than one function, e.g., may serve as both a thermal stabilizer and a catalytic promoter. Catalytic promoters for oxidation and reduction reactions may include, for example, oxides of one or more of manganese, vanadium, copper, iron, cobalt, chromium, zirconium, nickel and the like. Such cataltyic promoters may be introduced as the bulk oxide or as a precursor compound which is converted to the oxide upon calcination or upon use of the catalyst.

With respect to the amount of platinum group metal catalytic component utilized in the catalyst, it is of course desired to minimize the amount of these expensive materials consistent with providing an effective catalyst. Since the amount of platinum and palladium occurring in naturally mined ores is much greater than the amount of rhodium occurring in such ores, the proportion of platinum ( and palladium, when palladium is utilized) is usually significantly higher than that of rhodium in the catalyst. Thus, the combined weight of platinum, or of platinum and palladium, is usually in excess of twice the amount of rhodium, preferably at least four times the amount of rhodium, and most preferably at least ten times the amount of rhodium present. The total weight of platinum group metal catalytic component utilized, measured as the metal, typically will not exceed about 10 weight percent of the weight of the catalytic material, for example, it will comprise from about 0.01 to about 8%, more preferably from about 0.05 to 5 weight percent of the catalytic material. In this context, reference to the "catalytic material" is to the material comprising alumina, catalytic components and stabilizers and/or, if present, other modifiers such as reaction promoters, and excludes the usually catalytically inert carrier substrate. For typical automotive exhaust gas catalytic converters, the catalyst composition (catalyst material plus monolithic substrate) generally may comprise from about 0.25 to about 4.0, preferably about 0.25 to about 3.0, g/in$^3$ of catalytic material coating, including about 0 to about 25, preferably about 0.1 to about 15, g/ft$^3$ rhodium and about 0.5 to about 150, preferably about 1 to about 90, g/ft$^3$ of platinum and/or palladium.

In preparing the catalyst, a platinum group metal catalytic component such as a suitable compound as/or complex of any of the platinum group metals may be utilized to achieve dispersion of the catalytic component on the activated alumina support particles. Water soluble compounds or water dispersible complexes as well as organic soluble or dispersible compounds or complexes of one or more platinum group metals may be utilized as long as the liquid used to impregnate or deposit the catalytic metal compounds onto the alumina support particles do not adversely react with the catalytic metal or its compound or complex or the other components of the slurry, and are capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of complexes of the platinum group metals are preferred. For example, suitable compounds are chloroplatinic acid, potassium platinum chloride, ammonium platinum thiocyanate, amine solubilized platinum hydroxide, rhodium chloride, rhodium nitrate, palladium chloride, palladium nitrate, etc. If both platinum and palladium are to be impregnated onto the activated alumina particles, both are preferably in water soluble form such as, for example, as the respective amine hydroxide or as chloroplatinic acid, palladium nitrate or palladium chloride. During the calcination step, or at least during the initial phase of use of the catalyst, such compounds are converted into a catalytically active form of the platinum group metal or a compound thereof.

Specific compositions in accordance with the present invention may include, in addition to one or more bulk stabilizers admixed or otherwise combined with the activated alumina as described above, a platinum group metal component selected from one or more of a platinum component, a palladium component and a rhodium component. One or more of these platinum group metal components may be dispersed on and comprise part of an adherent coating of activated alumina on the gas flow passages of a carrier substrate.

In addition, one or more catalyst modifiers may be included as part of the catalyst composition. Among such catalyst modifiers are the above-mentioned conventional thermal stabilizers and catalyst promoters such as promoters for oxidation and/or reduction reactions. The latter group of catalytic promoters includes ceria in bulk form, which is known to promote oxidation and reduction reactions, as well as, for example, oxides of one or more of manganese, vanadium, copper, iron, cobalt, chromium, zirconium, nickel and the like. Such materials may be introduced as the oxide or as a precursor which is converted to the oxide upon calcination or upon use of the catalyst. For example, three-way conversion catalysts comprising a platinum group metal and having a base metal oxide selected from oxides of metals having an atomic number from 25 to 28 plus rhenium and mixtures thereof, are disclosed in U.S. Pat. No. 4,157,316 of C.E. Thompson et al. Such oxidation-reduction promoters may be incorporated in the catalytic composition in amounts ranging from about 0.05 to about 50% by weight, preferably from about 0.5 to about 25% by weight of the catalytic material. Some modifiers may serve more than one function, e.g., as both a thermal stabilizer and a catalytic promoter, Such catalytic modifiers, or precursors thereof, may be added in bulk form or may be impregnated from a solution or liquid dispersion into the activated alumina particles either before or after the alumina particles are formed into an adherent, calcined coating on the carrier substrate.

While the invention has been described in detail with respect to specific preferred embodiments thereof, it will be apparent to those skilled in the art upon a reading of the foregoing that numerous variations may be made thereto without departing from the scope of the invention or the appended claims.

What is claimed is:

1. A catalyst comprising (a) activated alumina, (b) a substantially water-insoluble bulk stabilizer selected from the group consisting of one or more of strontium sulfate and barium sulfate, the bulk stabilizer being present in an amount sufficient to stabilize the activated alumina against thermal degradation; and (c) a catalytic component dispersed on the activated alumina.

2. The catalyst of claim 1 wherein the bulk stabilizer comprises barium sulfate.

3. The catalyst of claim 1 including a carrier substrate on which the activated alumina is disposed.

4. The catalyst of claim 1, claim 2 or claim 3 comprising an admixture of the activated alumina and the bulk stabilizer, the bulk stabilizer being present in an amount of from about 0.5 to 50% by weight of the weight of the activated alumina.

5. The catalyst of claim 4 wherein the bulk stabilizer is present in an amount of from about 1 to 30% by weight of the activated alumina.

6. The catalyst of claim 4 wherein the admixture further includes one or more of catalytic modifiers.

7. The catalyst of claim 1, claim 2 or claim 3 wherein the bulk stabilizer is comprised of particles at least about 0.1 micron in diameter.

8. The catalyst of claim 1, claim 2 or claim 3 wherein the activated alumina is an unstabilized alumina except insofar as it is stabilized by the presence of the bulk stabilizer.

9. The catalyst of claim 1, claim 2 or claim 3 wherein the activated alumina is a stabilized alumina independently of the presence of the bulk stabilizer.

10. The catalyst of claim 1, claim 2 or claim 3 wherein the catalytic component is a platinum group metal catalytic component dispersed on the activated alumina.

11. The catalyst of claim 10 wherein an admixture of he activated alumina and bulk stabilizer is coated upon a carrier substrate comprising a structure having a plurality of fine gas flow passages extending therethrough.

12. The catalyst of claim 10 wherein the platinum group metal catalytic component is selected from the group consisting of one or more of a platinum component, a palladium component and a rhodium component.

13. A catalyst comprising (a) a carrier substrate; (b) a coating on the substrate of an admixture of activated alumina and a thermally-stabilizing amount of a substantially water-insoluble bulk stabilizer selected from the group consisting of one or more of strontium sulfate and barium sulfate; and (c) a platinum group metal catalytic component dispersed on the activated alumina.

14. The catalyst of claim 13 wherein the bulk stabilizer is present in an amount of from about 0.5 to 50% by weight of the weight of activated alumina and is comprised of particles of at least about 0.1 micron in diameter.

15. The catalyst of claim 13 wherein the carrier substrate has extending therethrough a plurality of gas flow passages defined by passage walls, and the coating is disposed on the passage walls.

16. The catalyst of claim 13 wherein the platinum group metal catalytic component is selected from the group consisting of one or more of a platinum component, a palladium component and a rhodium component.

17. The catalyst of any one of claims 13, 14, 15 or 16 wherein the bulk stabilizer comprises barium sulfate.

18. A method of making a catalyst comprising activated alumina and a thermally stabilizing amount of a substantially water-insoluble bulk thermal stabilizer selected from the group consisting of one or more of strontium sulfate and barium sulfate, the method comprising: (a) combining the bulk stabilizer in particulate form with one or both of the activated alumina and activated alumina precursor, (b) depositing a catalytic component on the activated alumina and (c) when said precursor is present, converting said precursor to activated alumina.

19. The method of claim 18 wherein the bulk stabilizer comprises barium sulfate.

20. The method of claim 18 or claim 19 including dispersing on the activated alumina a platinum group metal component as said catalytic component.

21. The method of claim 18 or claim 19 further including (c) applying the bulk stabilizer and one or both of the activated alumina and activated alumina precursor as a coating to a carrier substrate; and (d) calcining the resultant coated substrate having the platinum group metal catalytic component dispersed thereon, to provide a calcined coating of the same on the carrier.

22. The method of claim 21 wherein the activated alumina precursor is selected from the class consisting of one or more of alumina sol and soluble aluminum salts which convert to activated alumina upon calcining.

23. The method of claim 21 including combining the activated alumina with an amount of bulk stabilizer of from about 0.5 to 50% by weight of the weight of activated alumina.

24. The method of claim 21 wherein the bulk stabilizer comprises particles of at least about 0.1 micron in diameter.

25. The method of claim 21 wherein the activated alumina is an unstabilized alumina except insofar as it is stabilized by the presence of the bulk stabilizer.

26. The method of claim 21 including stabilizing the activated alumina independently of the presence of the bulk stabilizer.

27. The method of claim 21 including a preliminary step of mixing the alumina and/or its precursors and stabilizer to form an admixture thereof; and carrying out step (c) by applyng the admixture to the carrier substrate.

28. The method of claim 21 including employing activated alumina in step (a).

29. The method of claim 18 or claim 19 including employing activated alumina in step (a).

30. The method of claim 18 or claim 19 wherein the activated alumina precursor is selected from the class consisting of one or more of alumina sol and soluble aluminum salts which convert to activated alumina upon calcining.

31. The method of claim 18 or claim 19 including adding one or more catalyst modifiers to the catalyst.

32. The method of claim 18 or claim 19 wherein the combining of step (b) comprises mixing one or both of the alumina and alumina precursor and the stabilizer to form an admixture thereof.

* * * * *